United States Patent
Liao et al.

(10) Patent No.: US 10,216,073 B2
(45) Date of Patent: Feb. 26, 2019

(54) PROJECTION APPARATUS

(71) Applicant: Coretronic Corporation, Hsin-Chu (TW)

(72) Inventors: Tsung-Hsin Liao, Hsin-Chu (TW); Chun-Hsin Lu, Hsin-Chu (TW); Chun-Li Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/940,986

(22) Filed: Mar. 30, 2018

(65) Prior Publication Data

US 2018/0292737 A1    Oct. 11, 2018

(30) Foreign Application Priority Data

Apr. 6, 2017   (CN) .......................... 2017 1 0220559

(51) Int. Cl.
  *G03B 21/14*      (2006.01)
  *H04N 9/31*       (2006.01)
  (Continued)

(52) U.S. Cl.
  CPC ......... *G03B 21/147* (2013.01); *G03B 21/006* (2013.01); *G03B 21/008* (2013.01); *G03B 21/208* (2013.01); *G03B 21/2033* (2013.01); *G03B 21/2066* (2013.01); *H04N 9/3111* (2013.01); *H04N 9/3185* (2013.01); *H04N 9/3188* (2013.01)

(58) Field of Classification Search
  CPC .. G03B 21/147; G03B 21/005; G03B 21/006; G03B 21/008; G03B 21/14; H04N 9/3111

USPC .................................................... 353/46–51
  See application file for complete search history.

(56) References Cited

U.S. PATENT DOCUMENTS

| 5,626,411 A | 5/1997 | Takahashi et al. |
| 8,556,431 B2 | 10/2013 | Bartlett et al. |

(Continued)

FOREIGN PATENT DOCUMENTS

| JP | H07104239 | 4/1995 |
| JP | H07104278 | 4/1995 |

(Continued)

OTHER PUBLICATIONS

"Search Report of European Counterpart Application," dated Aug. 16, 2018, pp. 1-8.

*Primary Examiner* — Ryan D Howard
(74) *Attorney, Agent, or Firm* — JCIPRNET (57) ABSTRACT

A projection apparatus including an illumination system, a light valve, an optical actuation element and a projection lens is provided. The illumination system provides an illumination beam. An image display surface of the light valve includes a first region and a second region. First pixels of the first region convert the illumination beam into first sub-image beams. Second pixels of the second region convert the illumination beam into second sub-image beams. A transmission path of one of the first sub-image beams in the optical actuation element is a first transmission path. A transmission path of one of the second sub-image beams in the optical actuation element is a second transmission path. A length of the first transmission path is smaller than a length of the second transmission path. In this way, the projection apparatus has good image quality.

11 Claims, 7 Drawing Sheets

(51) Int. Cl.
*G03B 21/00* (2006.01)
*G03B 21/20* (2006.01)

(56) References Cited

U.S. PATENT DOCUMENTS

| | | |
|---|---|---|
| 8,585,210 B2 | 11/2013 | Cheng et al. |
| 2006/0001839 A1 | 1/2006 | Beardsley et al. |
| 2006/0033887 A1 | 2/2006 | Wang |
| 2013/0038846 A1* | 2/2013 | Kojima .............. G02B 27/0994 |
| | | 353/97 |

FOREIGN PATENT DOCUMENTS

| | | |
|---|---|---|
| JP | H07113998 | 5/1995 |
| JP | H08043764 | 2/1996 |
| JP | 2006023574 | 1/2006 |
| TW | 1273339 | 2/2007 |

\* cited by examiner

PROJECTION APPARATUS

CROSS-REFERENCE TO RELATED APPLICATION

This application claims the priority benefit of China application serial no. 201710220559.9, filed on Apr. 6, 2017. The entirety of the above-mentioned patent application is hereby incorporated by reference herein and made a part of this specification.

BACKGROUND OF THE INVENTION

Field of the Invention

The invention relates to a projection apparatus, and particularly relates to a projection apparatus having a non-telecentric illumination system.

Description of Related Art

A general rear projection display product mainly adopts an optical engine to produce images and project the images on a screen. In order to achieve a higher resolution of the images projected on the screen by the optical engine, a technical means adopted by the rear projection display product of the existing technique is to dispose a transparent plate on a transmission path of an image beam of the rear projection display product, and control the transparent plate to vibrate back and forth in an angle within a frame period. Therefore, when the image beam coming from an imaging device is transmitted to the transparent plate, a transmission direction of the image beam can be changed along with the vibration of the transparent plate and switched within the frame period. Then, the image beam passing through the transparent plate is projected to the screen through a lens. When the transparent plate is not deflected to the angle, the image beam is projected to a predetermined position on the screen by the lens, and when the transparent plate is deflected to the angle, the deflected image beam is projected to another predetermined position on the screen through the lens, where the two positions are partially overlapped. Since the transmission direction of the image beam is changed by the transparent plate, a user may view images of different positions on the screen produced by the image beam within the frame period. An image resolution of the imaging device of the rear projection display product of the existing technique is, for example, 2720×1530, and through superposition of images of different positions within the frame period, the image projected on the screen may achieve a resolution effect of 4K (3846×2163).

However, the rear projection display product of the existing technique still has following disadvantages. For example, the image beam incident to the lens from a place adjacent to an optical axis of the lens is referred to as a chief beam, and the image beam incident to the lens from a place away from the optical axis of the lens is referred to as an off-axis beam. An incident angle of the off-axis beam incident to the lens is greater than an incident angle of the chief beam incident to the lens. In other words, the incident angle of the image beam is different at different places of the lens. Therefore, when the transparent plate is deflected to an angle, a part of the image formed by the off-axis beam is deviated from a part of the image formed by the chief beam due to a larger refraction degree, and a distortion phenomenon is produced at a boundary of the images. The distortion phenomenon may cause a poor image quality. Moreover, since an offset generally exists between the optical axis of the lens and the imaging device in the general rear projection display product, the aforementioned distortion phenomenon becomes more severe due to the offset.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a projection apparatus, which has good image quality.

Other objects and advantages of the invention may be further illustrated by the technical features broadly embodied and described as follows.

In order to achieve one or a portion of or all of the objects or other objects, an embodiment of the invention provides a projection apparatus including an illumination system, a light valve, an optical actuation element and a projection lens. The illumination system includes a light source. The light source provides an illumination beam. The light valve is disposed on a transmission path of the illumination beam. The light valve includes an image display surface, and is configured to convert the illumination beam into an image beam. The optical actuation element is disposed on a transmission path of the image beam. The optical actuation element is configured to deflect a transmission direction of the image beam within a frame period. The projection lens is configured to receive the image beam coming from the optical actuation element, and projects the image beam on a display medium to form an image frame. The image display surface of the light valve includes a first region and a second region. The first region includes a plurality of first pixels, and is configured to convert the corresponding illumination beam into a plurality of first sub-image beams. The second region includes a plurality of second pixels, and is configured to convert the corresponding illumination beam into a plurality of second sub-image beams. The first sub-image beams and the second sub-image beams form a part of the image beam. A transmission path of one of the first sub-image beams in the optical actuation element is a first transmission path. A transmission path of one of the second sub-image beams in the optical actuation element is a second transmission path. A length of the first transmission path is smaller than a length of the second transmission path.

According to the above description, in the projection apparatus of the invention, the second sub-image beam is first transmitted to the optical actuation element compared to the first sub-image beam, so that the length of the transmission path (i.e. the first transmission path) of the first sub-image beam in the optical actuation element is smaller than the length of the transmission path (i.e. the second transmission path) of the second sub-image beam in the optical actuation element. A position of the second sub-image beam leaving the optical actuation element is closer to a position of the first sub-image beam leaving the optical actuation element. Then, a position of the second sub-image beam entering the projection lens is closer to a position of the first sub-image beam entering the projection lens. In other words, an incident angle of the first sub-image beam entering the projection lens is close to an incident angle of the second sub-image beam entering the projection lens. In this way, a distance difference between a portion of the image frame formed by the first sub-image beam and a portion of the image frame formed by the second sub-image beam caused by refraction is relatively small, so that the projection apparatus of the invention has good image quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
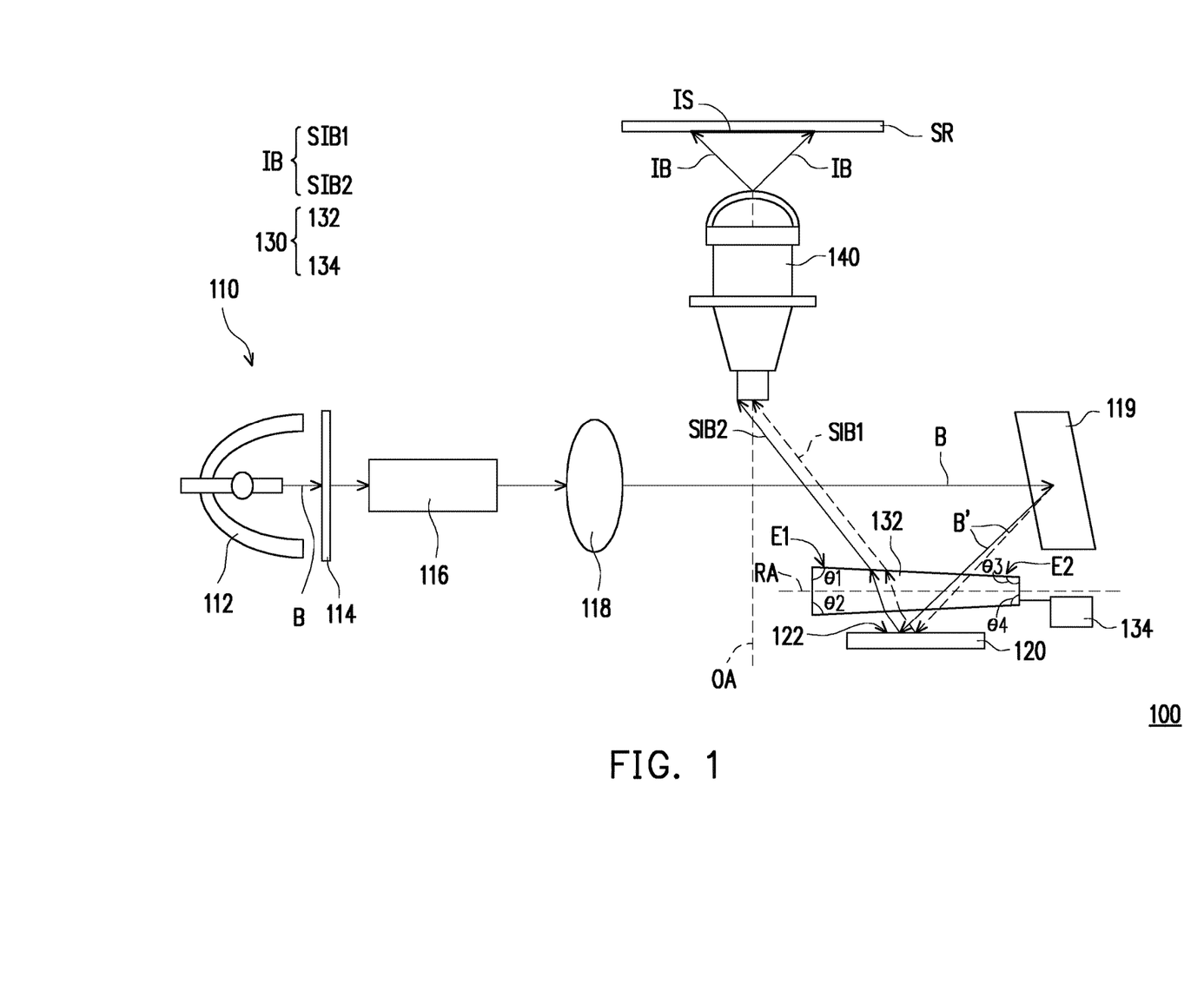
FIG. 1 is a schematic diagram of a projection apparatus according to an embodiment of the invention.
Figure 2:
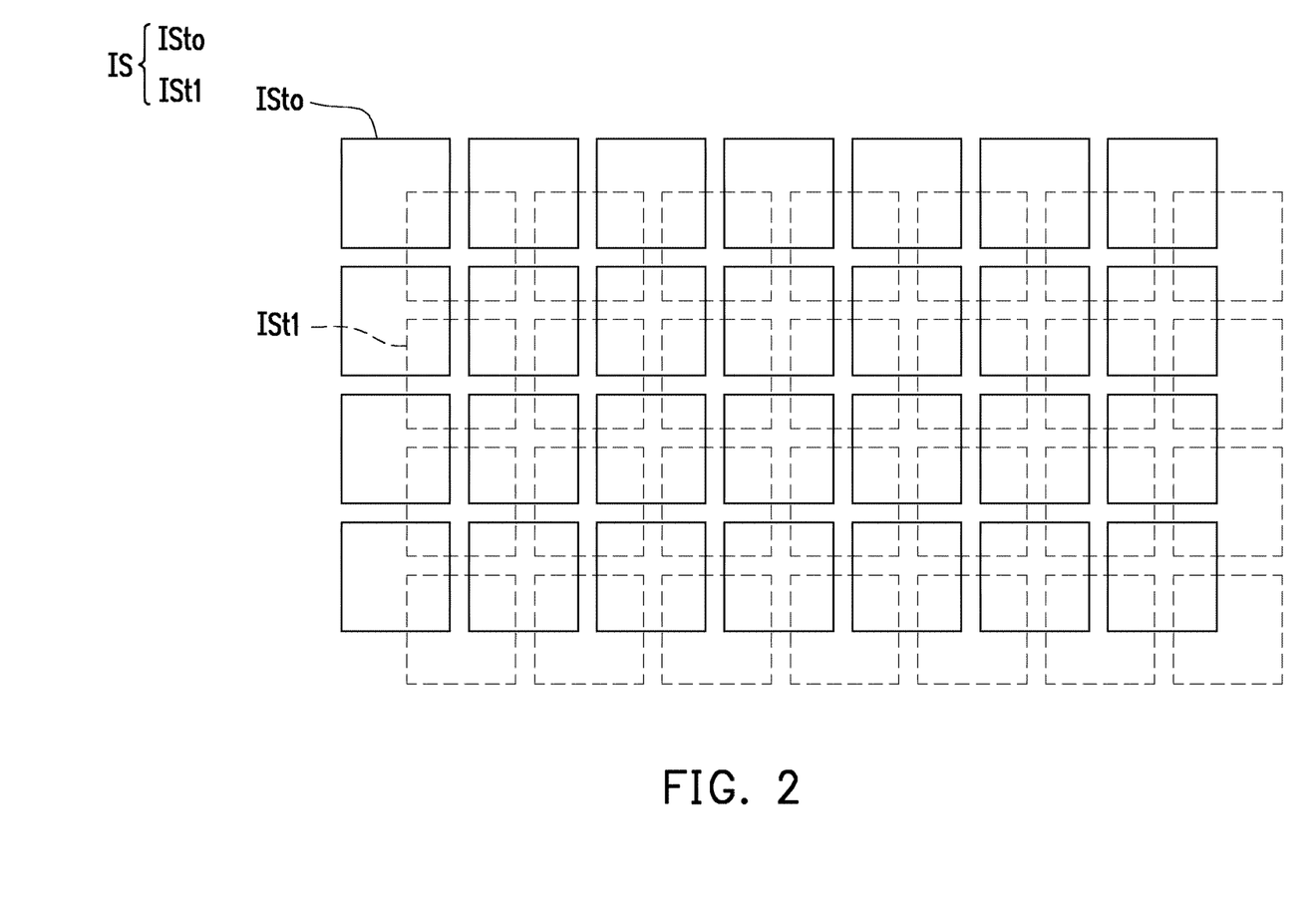
FIG. 2 is a schematic diagram of image frames presented at different positions by the projection apparatus of FIG. 1 within one frame period.
Figure 3:
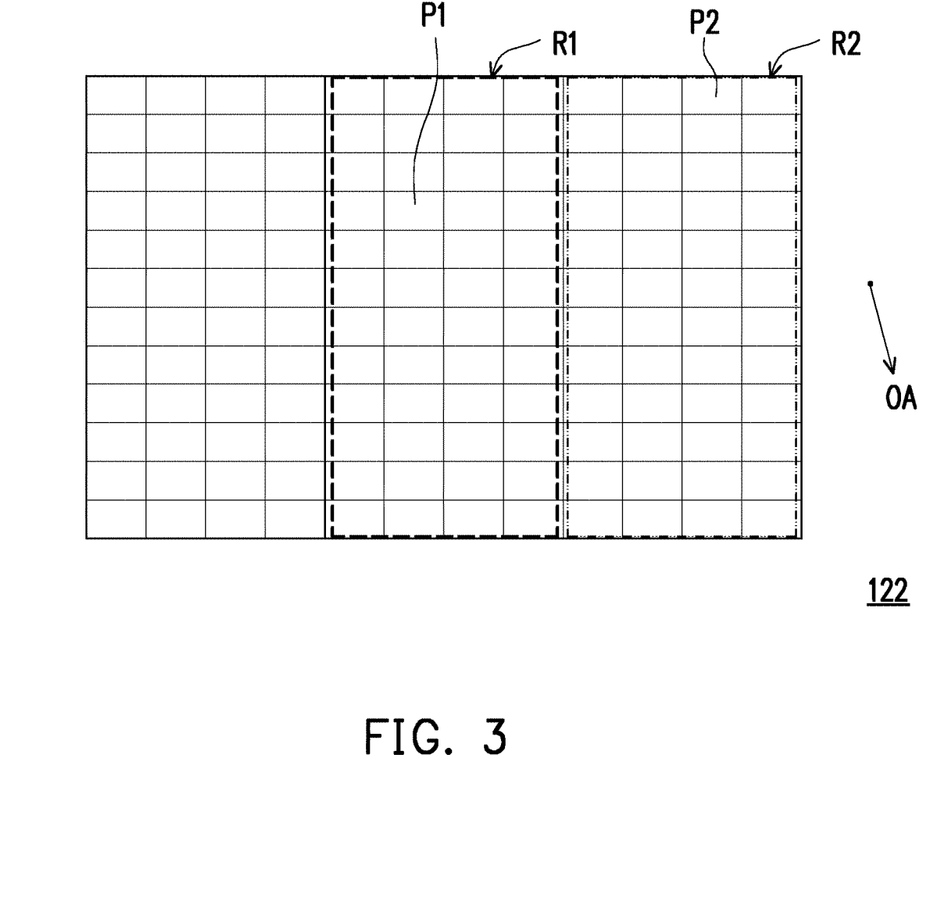
FIG. 3 is a top view of an image display surface of a light valve of FIG. 1.
Figure 4:
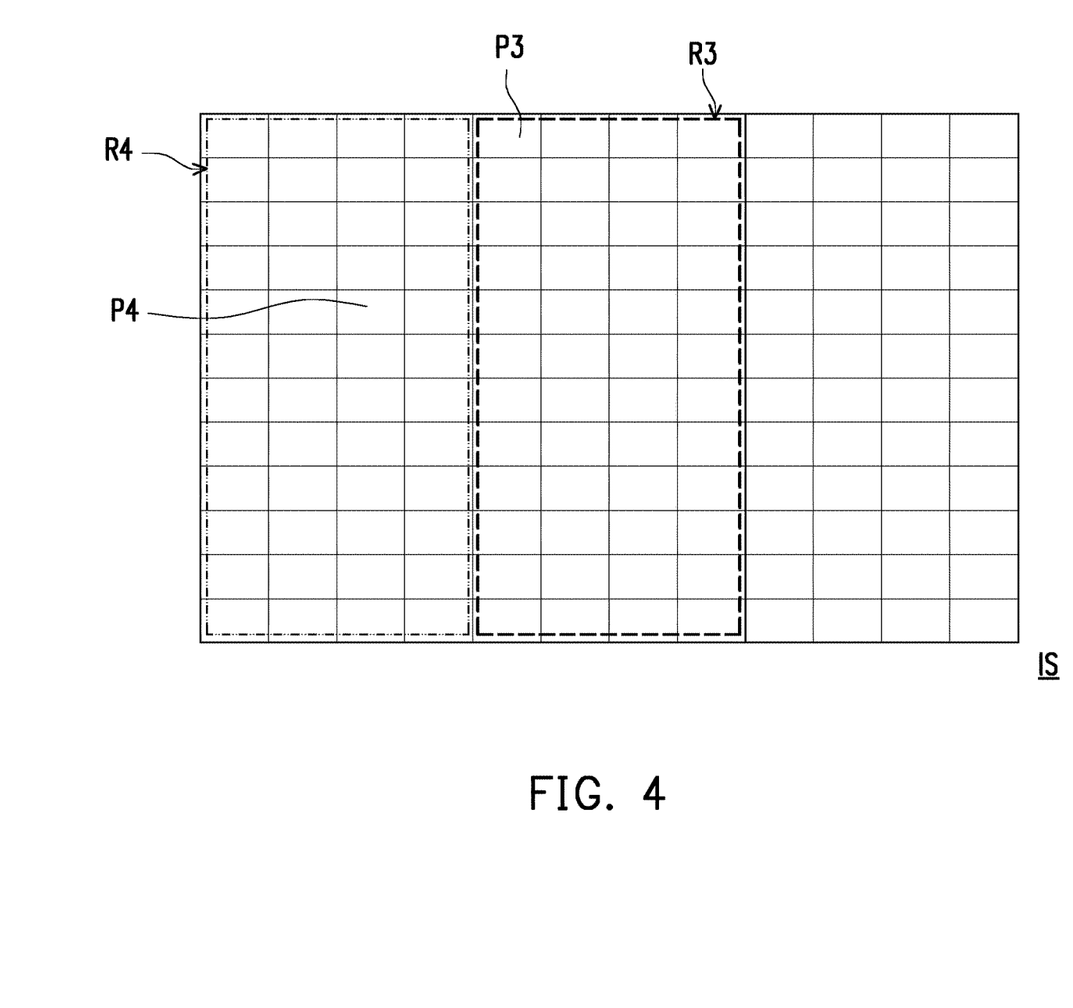
FIG. 4 is a schematic diagram of an image frame projected to a display medium by the projection apparatus of FIG. 1.
Figure 5:
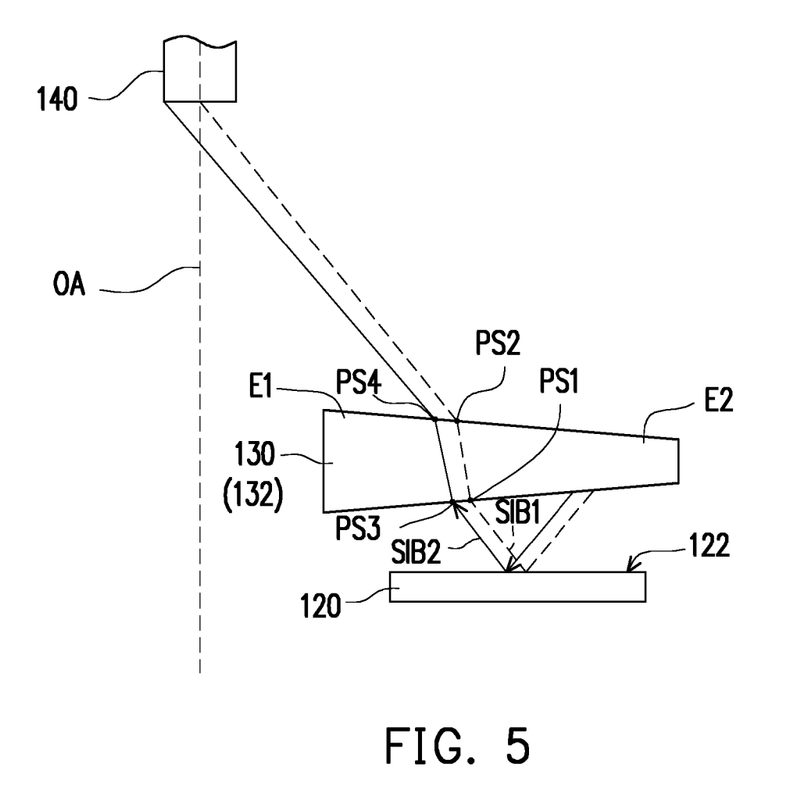
FIG. 5 is a schematic diagram of transmission paths of a first sub-image beam and a second sub-image beam in an optical actuation element of FIG. 1.

FIG. 1 is a schematic diagram of a projection apparatus according to an embodiment of the invention. FIG. 2 is a schematic diagram of image frames presented at different positions by the projection apparatus of FIG. 1 within one frame period. FIG. 3 is a top view of an image display surface of a light valve of FIG. 1. FIG. 4 is a schematic diagram of an image frame projected to a display medium by the projection apparatus of FIG. 1. FIG. 5 is a schematic diagram of transmission paths of a first sub-image beam and a second sub-image beam in an optical actuation element of FIG. 1.

Referring to FIG. 1, in the embodiment, the projection apparatus 100 includes an illumination system 110, a light valve 120, an optical actuation element 130 and a projection lens 140. In detail, the illumination system 110 is embodied by a non-telecentric illumination system. The above devices are described in detail below.

In the embodiment, the illumination system 110 includes a light source 112, a filter layer 114, an integration rod 116, a light converging lens 118 and a reflection element 119. The light source 112 provides an illumination beam B. In the embodiment, a type of the light source 112 is, for example, a high intensity discharge (HID) lamp, a high pressure mercury lamp, a laser light source, a light-emitting diode (LED) or other light sources adapted to emit a light beam, though the invention is not limited thereto. The filter layer 114 is, for example, an infrared or ultraviolet (IR/UV) filter. The light converging lens 118 is, for example, a convex lens or other lens element having a light converging function, though the invention is not limited thereto. The reflection element 119 is, for example, a reflector mirror, or other element having a reflection function, which is not limited by the invention.

In the embodiment, the light valve 120 is disposed on a transmission path of the illumination beam B'. To be specific, the illumination beam B emitted by the light source 112 sequentially passes through the filter layer 114, the integration rod 116 and the light converging lens 118, and is transmitted to the reflection element 119. The reflection element 119 reflects the illumination beam B. The reflected illumination beam B' is transmitted to the light valve 120. The light valve 120 includes an image display surface 122, and the light valve 120 is configured to convert the illumination beam B' into an image beam IB. In the embodiment, the light valve 120 is, for example, a digital micro-mirror device (DMD), reflective liquid crystal on silicon (LCOS), etc., or a transmissive spatial light modulator, for example, a transparent liquid crystal panel, though the invention is not limited thereto.

In the embodiment, the reflected illumination beam B' passes through the optical actuation element 130. The optical actuation element 130 is disposed on a transmission path of the image beam IB, and is configured to deflect a transmission direction of the image beam IB within a frame period, wherein the image beam IB includes a first sub-image beam SIB1 and a second sub-image beam SIB2. The projection lens 140 is configured to receive the image beam IB coming from the optical actuation element 130, and projects the image beam IB on a display medium SR (for example, a screen or a wall) to form an image frame IS (shown by a thick black line) on the display medium SR. In the embodiment, the optical actuation element 130 further includes a light transmitting element 132 and an actuator 134. A material of the light transmitting element 132 is, for example, glass, transparent plastic, etc., though the invention is not limited thereto. The actuator 134 is, for example, a motor, though the invention is not limited thereto. The projection lens 140 has an optical axis OA. The light transmitting element 132 has a first end E1 and a second end E2 opposite to each other. The first end E1 of the light transmitting element 132 is closer to the optical axis OA of the projection lens 140 compared to the second end E2 of the light transmitting element 132. The actuator 134 is used for controlling the light transmitting element 132 to make the light transmitting element 132 to deflect back and forth along a rotation axis RA parallel to the image display surface 122 of the light valve 120, where the optical axis OA of the projection lens 140 is substantially perpendicular to the rotation axis RA of the light transmitting element 132, though the invention is not limited thereto. Referring to FIG. 1, the light transmitting element 132 can be a wedge-shaped element and a width of the wedge-shaped element is gradually decreased along a direction from the first end E1 to the second end E2, and a surface of the light transmitting element 132 facing to the light valve 120 may at least receive all of the image beam IB sent by the image display surface 122 of the light valve 120. To be specific, an implementation of a cross section of the light transmitting element 132 is a trapezoid, though the invention is not limited thereto, where the cross section of the light transmitting element 132 is parallel to a paper surface. As long as the condition that the width of the light transmitting element 130 is gradually decreased along the direction from the first end E1 to the second end E2 is satisfied, those skilled in the art may properly adjust the shape of the light transmitting element 132 according to an actual design requirement. The cross section of the light transmitting element 132 is perpendicular to the image display surface 122 of the light valve 120. A gradient of the trapezoid presented by the cross section is 1 degree. In detail, two base angles θ1, θ2 of the cross section of the light transmitting element 132 close to the first end E1 are all 89 degrees, and two vertex angles θ3, θ4 of the cross section of the light transmitting element 132 close to the second end E2 are all 91 degrees, though the invention is not limited thereto.

According to the above description, when the image beam IB passes through the light transmitting element 132, the actuator 134 makes the light transmitting element 132 to quickly deflect back and forth along the rotation axis RA within a predetermined angle, such that the transmission direction of the image beam IB is changed by the deflected light transmitting element 132. The image beam IB of different time points is projected to the display medium SR by the projection lens 140 to form the image frame IS located at different positions. Referring to FIG. 2, in the embodiment, the frame period is, for example, defined by two different time point $T_0$ and time point $T_1$. In FIG. 2, an image frame $IS_{r0}$ indicated by solid lines is an image frame formed by the image beam IB at the time point $T_0$, which includes a plurality of image pixels (unmarked), and an image frame $IS_{r1}$ indicated by dash lines is an image frame formed by the image beam IB at the time point $T_1$, which includes a plurality of shifted image pixels (unmarked). Further, at the time point $T_0$, the light transmitting element 132 is not deflected to the predetermined angle, and the image beam IB forms the image frame $IS_{r0}$. At the time point $T_1$, the light transmitting element 132 is deflected to the predetermined angle along the rotation axis RA, and the transmission direction of the image beam IB is changed to form the image frame $IS_{r1}$. Through the deflection of the optical actuation element 130, each of the pixels in the image frame $IS_{r0}$ is shifted by a predetermined distance, for example, ½pixel along a predetermined direction to form the image frame $IS_{r1}$. Therefore, by configuring the light transmitting element 132 and the actuator 134, the projection apparatus 100 of the embodiment may display the image frames $IS_{r0}$ and $IS_{r1}$ at different positions on the display medium SR within one frame period, and the two image frames $IS_{r0}$ and $IS_{r1}$ are partially overlapped, so that the resolution of the image frame is increased.

Referring to FIG. 1 and FIG. 3, in the embodiment, FIG. 3 is a top view of the image display surface of the light valve of FIG. 1. The image display surface 122 of the light valve 120 includes a first region R1 and a second region R2. In FIG. 3, the first region R1 is a region encircled by thick black dash lines, and the second region R2 is a region encircled by thin black dash lines. To be specific, the first region R1 is a central region of the image display surface 122, and the second region R2 is an edge region of the image display surface 122, though the invention is not limited thereto. The second region R2 is closer to the optical axis OA of the projection lens 140 relative to the first region R1, i.e. the second region R2 is closer to the first end E1 of the light transmitting element 134 relative to the first region R1. The first region R1 includes a plurality of first pixels P1. The second region R2 includes a plurality of second pixels P2. The first pixels P1 are configured to convert the corresponding illumination beam B' into a plurality of the first sub-image beams SIB1. The second pixels P2 are configured to convert the corresponding illumination beam B into a plurality of the second sub-image beams SIB2. The first sub-image beams SIB1 and the second sub-image beams SIB2 form a part of the image beam IB. Referring to FIG. 1, in the embodiment, when the first sub-image beams SIB1 and second sub-image beams SIB2 enter the projection lens 140, the first sub-image beams SIB1 are closer to the optical axis OA of the projection lens 140 compared to the second sub-image beams SIB2, so that the first sub-image beams SIB1 are referred to as chief beams, and the second sub-image beams SIB2 are referred to as off-axis beams.

Referring to FIG. 4, in the embodiment, the image frame IS has a third region R3 and a fourth region R4. The third region R3 includes a plurality of third image pixels P3. The fourth region R4 includes a plurality of fourth image pixels P4. The third region R3 corresponds to the first region R1 of the image display surface 122, and the third image pixels P3 respectively correspond to the first pixels P1. The fourth region R4 corresponds to the second region R2 of the image display surface 122, and the fourth image pixels P4 respectively correspond to the second pixels P2. The fourth region R4 is located away from a center of the image frame IS compared to the third region R3. The first sub-image beams SIB1 form a portion of the image frame IS (for example, a central portion of the image frame IS) in the third region R3, and the second sub-image beams SIB2 form the other portion of the image frame IS (for example, an edge portion of the image frame IS) in the fourth region R4.

Referring to FIG. 5, in the embodiment, one of the first sub-image beams SIB1 and one of the second sub-image beams SIB2 are schematically illustrated, a transmission path of one of the first sub-image beams SIB1 in the optical actuation element 130 is a first transmission path, and the optical actuation element 130 of the present embodiment includes the light transmitting element 132. A transmission path of one of the second sub-image beams SIB2 in the optical actuation element 130 is a second transmission path. A length of the first transmission path is smaller than a length of the second transmission path. To be specific, one of the first sub-image beams SIB1 enters the light transmitting element 132 from a first position PS1 of the light transmitting element 132, and leaves the light transmitting element 132 from a second position PS2 of the light transmitting element 132. One of the second sub-image beams SIB2 enters the light transmitting element 132 from a third position PS3 of the light transmitting element 132, and leaves the light transmitting element 132 from a fourth position PS4 of the light transmitting element 132. The third position PS3 is closer to the first end E1 of the light transmitting element 132 compared to the first position PS1. The fourth position PS4 is closer to the first end E1 of the light transmitting element 132 compared to the second position PS2. The first position PS1 and the second position PS2 define the first transmission path. The third position PS3 and the fourth position PS4 define the second transmission path.

According to the above description, in the projection apparatus 100 of the embodiment, the second sub-image beam SIB2 is first transmitted to the optical actuation element 130 compared to the first sub-image beam SIB1, so that the length of the transmission path (i.e. the first transmission path) of the first sub-image beam SIB1 in the optical actuation element 130 is smaller than the length of the transmission path (i.e. the second transmission path) of the second sub-image beam SIB2 in the optical actuation element 130. A position of the second sub-image beam SIB2 leaving the optical actuation element 130 can be closer to a position of the first sub-image beam SIB1 leaving the optical actuation element 130. Then, a position of the second sub-image beam SIB2 (the off-axis beam) entering the projection lens 140 can be closer to a position of the first sub-image beam SIB1 (the chief beam) entering the projection lens 140. In other words, an incident angle of the first sub-image beam SIB1 entering the projection lens 140 is closer to an incident angle of the second sub-image beam SIB2 entering the projection lens 140. In this way, when the light transmitting element 132 is deflected to the predetermined angle, a distance difference between a portion of the image frame formed by the first sub-image beam SIB1 in the third region R3 and a portion of the image frame formed by the second sub-image beam SIB2 in the fourth region R4 caused by refraction is relatively small, i.e. the fourth image pixels P4 are not deviated from the third image pixels P3 in the third region R3 due to the deflection of the light transmitting element 132, so that the distortion phenomenon is not so obvious, and the projection apparatus 100 of the embodiment has good image quality.

It should be noted that in the projection apparatus 100 of the embodiment, by designing the gradient of the trapezoidal cross section of the light transmitting element to be 1 degree, a distortion degree of the image pixels in the image frame can be smaller than 3% of a displacement of a same image pixel in the image frame in two different time points $T_0$ and $T_1$.

It should be noted that reference numbers of the components and a part of contents of the aforementioned embodiment are also used in the following embodiment, wherein the same reference numbers denote the same or like components, and descriptions of the same technical contents are omitted. The aforementioned embodiment can be referred for descriptions of the omitted parts, and detailed descriptions thereof are not repeated in the following embodiment.

Figure 6:
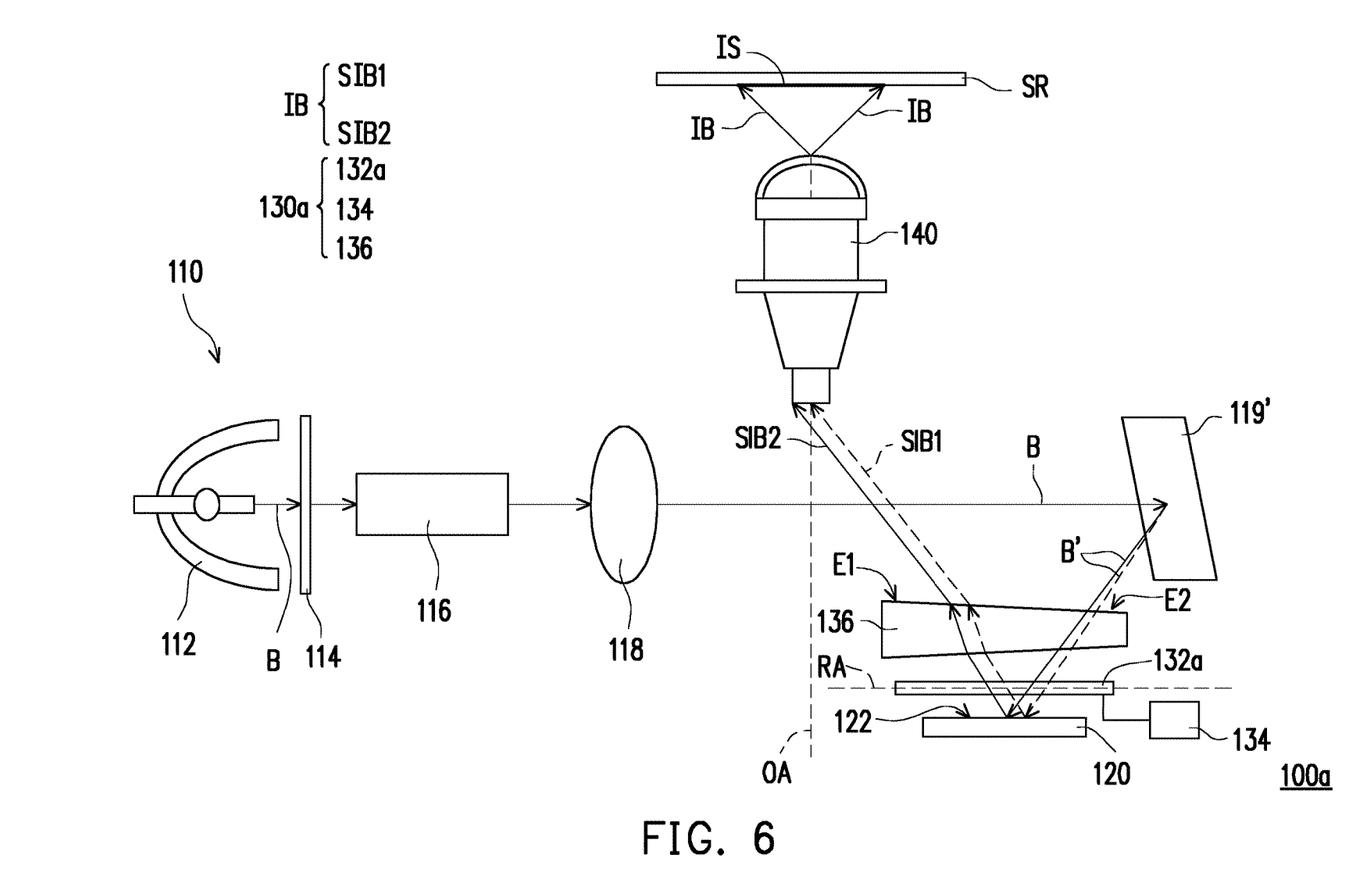
FIG. 6 is a schematic diagram of a projection apparatus according to another embodiment of the invention.
Figure 7:
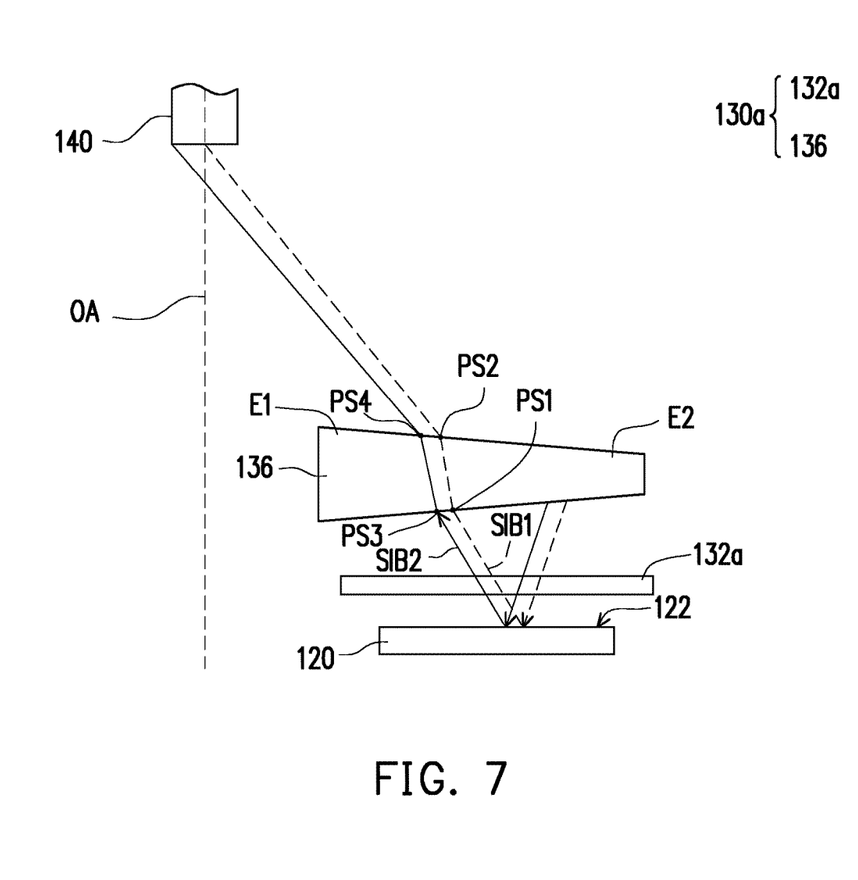
FIG. 7 is a schematic diagram of transmission paths of a first sub-image beam and a second sub-image beam in an optical actuation element of FIG. 6.

FIG. 6 is a schematic diagram of a projection apparatus according to another embodiment of the invention. FIG. 7 is a schematic diagram of transmission paths of a first sub-image beam and a second sub-image beam in an optical actuation element of FIG. 6.

Referring to FIG. 6, the projection apparatus 100a of FIG. 6 is substantially similar to the projection apparatus 100 of FIG. 1, and a main difference there between is that the optical actuation element 130a includes a light transmitting element 132a, the actuator 134 and a prism structure 136. A cross section of the light transmitting element 132a is a rectangle and the rectangular cross section is perpendicular to the image display surface 122 of the light valve 120. The prism structure 136 is disposed between the light valve 120 and the projection lens 140. The prism structure 136 has a first end E1 and a second end E2 opposite to each other. The first end E1 of the prism structure 136 is closer to the optical axis OA of the projection lens 140 relative to the second end E2 of the prism structure 136. A width of the prism structure 136 is gradually decreased along a direction from the first end E1 to the second end E2. In detail, in the embodiment, the prism structure 136 is located between the light transmitting element 132a and the projection lens 140. In other embodiments that are not illustrated, the prism structure 136 can be disposed between the light transmitting element 132a and the light valve 120, which is not limited by the invention.

Referring to FIG. 7, in the embodiment, one of the first sub-image beams SIB1 and one of the second sub-image beams SIB2 are schematically illustrated, a transmission path of one of the first sub-image beams SIB1 in the optical actuation element 130a is a first transmission path, and a transmission path of one of the second sub-image beams SIB2 in the optical actuation element 130a is a second transmission path. A length of the first transmission path is smaller than a length of the second transmission path. To be specific, one of the first sub-image beams SIB1 enters the prism structure 136 from a first position PS1 of the prism structure 136, and leaves the prism structure 136 from a second position PS2 of the prism structure 136. One of the second sub-image beams SIB2 enters the prism structure 136 from a third position PS3 of the prism structure 136, and leaves the prism structure 136 from a fourth position PS4 of the prism structure 136. The third position PS3 is closer to the first end E1 of the prism structure 136 compared to the first position PS1. The fourth position PS4 is closer to the first end E1 of the prism structure 136 compared to the second position PS2. The first position PS1 and the second position PS2 define the first transmission path. The third position PS3 and the fourth position PS4 define the second transmission path. An optical effect of the projection apparatus 100a of the embodiment is similar to the optical effect of the projection apparatus 100 of the embodiment of FIG. 1, and detail thereof is not repeated. Therefore, the projection apparatus 100a of the embodiment has good image quality.

In summary, the projection apparatus of the invention has at least one of the following advantages: in the projection apparatus of the invention, the second sub-image beam is first transmitted to the optical actuation element compared to the first sub-image beam, so that the length of the transmission path (i.e. the first transmission path) of the first sub-image beam in the optical actuation element is smaller than the length of the transmission path (i.e. the second transmission path) of the second sub-image beam in the optical actuation element. A position of the second sub-image beam leaving the optical actuation element is closer to a position of the first sub-image beam leaving the optical actuation element. Then, a position of the second sub-image beam entering the projection lens is closer to a position of the first sub-image beam entering the projection lens. In other words, an incident angle of the first sub-image beam entering the projection lens is close to an incident angle of the second sub-image beam entering the projection lens. In this way, a distance difference between a portion of the image frame formed by the first sub-image beam and a portion of the image frame formed by the second sub-image beam caused by refraction is relatively small, so that the distortion phenomenon is not so obvious, and the projection apparatus of the invention has good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terns are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an illumination system, comprising a light source, wherein the light source provides an illumination beam;
   a light valve, disposed on a transmission path of the illumination beam, the light valve comprising an image display surface, and configured to convert the illumination beam into an image beam;
   an optical actuation element, disposed on a transmission path of the image beam, and configured to deflect a transmission direction of the image beam within a frame period; and
   a projection lens, configured to receive the image beam coming from the optical actuation element, and projecting the image beam to a display medium to form an image frame on the display medium,
   wherein the image display surface of the light valve comprises a first region and a second region, the first region comprises a plurality of first pixels configured to convert the corresponding illumination beam into a plurality of first sub-image beams, the second region comprises a plurality of second pixels configured to convert the corresponding illumination beam into a plurality of second sub-image beams, the first sub-image beams and the second sub-image beams form a part of the image beam,
   a transmission path of one of the first sub-image beams in the optical actuation element is a first transmission path, a transmission path of one of the second sub-image beams in the optical actuation element is a second transmission path, and a length of the first transmission path is smaller than a length of the second transmission path,
   wherein the projection lens has an optical axis, and the second region is closer to the optical axis of the projection lens relative to the first region.

2. The projection apparatus as claimed in claim 1, wherein a cross section of the light transmitting element is a trapezoid, and the cross section is perpendicular to the image display surface of the light valve.

3. The projection apparatus as claimed in claim 1, wherein one of the first sub-image beams enters the light transmitting element from a first position of the light transmitting element, and leaves the light transmitting element from a second position of the light transmitting element, and one of the second sub-image beams enters the light transmitting element from a third position of the light transmitting element, and leaves the light transmitting element from a fourth position of the light transmitting element, the third position is closer to the first end compared to the first position, and the fourth position is closer to the first end compared to the second position,
   wherein the first position and the second position define the first transmission path, and the third position and the fourth position define the second transmission path.

4. The projection apparatus as claimed in claim 1, wherein the image frame has a third region corresponding to the first region and a fourth region corresponding to the second region, and the fourth region is away from a center of the image frame compared to the third region, wherein the first sub-image beams form a portion of the image frame in the third region, and the second sub-image beams form another portion of the image frame in the fourth region.

5. The projection apparatus as claimed in claim 1, wherein the illumination system further comprises a filter layer, an integration rod, a light converging lens and a reflection element, wherein the illumination beam coming from the light source sequentially passes through the filter layer, the integration rod and the light converging lens and is transmitted to the reflection element, the reflection element reflects the illumination beam, and the reflected illumination beam is transmitted to the light valve.

6. The projection apparatus as claimed in claim 1, wherein the illumination system is a non-telecentric illumination system.

7. The projection apparatus as claimed in claim 2, wherein a gradient of the trapezoid is 1 degree.

8. A projection apparatus, comprising:
   an illumination system, comprising a light source, wherein the light source provides an illumination beam;
   a light valve, disposed on a transmission path of the illumination beam, the light valve comprising an image display surface, and configured to convert the illumination beam into an image beam;
   an optical actuation element, disposed on a transmission path of the image beam, and configured to deflect a transmission direction of the image beam within a frame period; and
   a projection lens, configured to receive the image beam coining from the optical actuation element, and projecting the image beam to a display medium to form an image frame on the display medium,
   wherein the image display surface of the light valve comprises a first region and a second region, the first region comprises a plurality of first pixels configured to convert the corresponding illumination beam into a plurality of first sub-image beams, the second region comprises a plurality of second pixels configured to convert the corresponding illumination beam into a plurality of second sub-image beams, the first sub-image beams and the second sub-image beams form a part of the image beam,
   a transmission path of one of the first sub-image beams in the optical actuation element is a first transmission path, a transmission path of one of the second sub-image beams in the optical actuation element is a second transmission path, and a length of the first transmission path is smaller than a length of the second transmission path,
   wherein the projection lens has an optical axis, and the optical actuation element further comprises: a light transmitting element, having a first end and a second end opposite to each other, the first end of the light transmitting element is closer to the optical axis of the projection lens compared to the second end of the light transmitting element, wherein a width of the light transmitting element is gradually decreased along a direction from the first end to the second end; and
   an actuator, configured to control the light transmitting element to make the light transmitting element to deflect back and forth along a rotation axis, wherein the rotation axis is parallel to the image display surface of the light valve.

9. A projection apparatus, comprising:
   an illumination system, comprising a light source, wherein the light source provides an illumination beam;
   a light valve, disposed on a transmission path of the illumination beam, the light valve comprising an image display surface, and configured to convert the illumination beam into an image beam;
   an optical actuation element, disposed on a transmission path of the image beam, and configured to deflect a transmission direction of the image beam within a frame period; and
   a projection lens, configured to receive the image beam coming from the optical actuation element, and projecting the image beam to a display medium to form an image frame on the display medium,
   wherein the image display surface of the light valve comprises a first region and a second region, the first region comprises a plurality of first pixels configured to convert the corresponding illumination beam into a plurality of first sub-image beams, the second region comprises a plurality of second pixels configured to convert the corresponding illumination beam into a plurality of second sub-image beams, the first sub-image beams and the second sub-image beams form a part of the image beam,
   a transmission path of one of the first sub-image beams in the optical actuation element is a first transmission path, a transmission path of one of the second sub-image beams in the optical actuation element is a second transmission path, and a length of the first transmission path is smaller than a length of the second transmission path,
   wherein the projection lens has an optical axis, and the optical actuation element further comprises: a light transmitting element, wherein a cross section of the light transmitting element is a rectangle, and the cross section is perpendicular to the image display surface;
   an actuator, configured to control the light transmitting element to make the light transmitting element deflect back and forth along a rotation axis, wherein the rotation axis is parallel to the image display surface of the light valve; and
   a prism structure, disposed between the light valve and the projection lens, and having a first end and a second end opposite to each other, the first end of the prism structure being closer to the optical axis of the projection lens compared to the second end of the prism structure, wherein a width of the prism structure is gradually decreased along a direction from the first end to the second end.

10. The projection apparatus as claimed in claim 9, wherein the prism structure is located between the light transmitting element and the projection lens, or the prism structure is located between the light transmitting element and the light valve.

11. The projection apparatus as claimed in claim 9, wherein one of the first sub-image beams enters the prism structure from a first position of the prism structure, and leaves the prism structure from a second position of the prism structure, and one of the second sub-image beams enters the prism structure from a third position of the prism structure, and leaves the prism structure from a fourth position of the prism structure, the first position is closer to the first end compared to the third position, and the second position is closer to the first end compared to the fourth position, wherein the first position and the second position define the first transmission path, and the third position and the fourth position define the second transmission path.

* * * * *